US006481624B1

(12) United States Patent
Hayduchok

(10) Patent No.: US 6,481,624 B1
(45) Date of Patent: Nov. 19, 2002

(54) METHOD AND APPARATUS FOR PROCESSING DOCUMENTS TO DISTINGUISH VARIOUS TYPES OF DOCUMENTS

(75) Inventor: George L. Hayduchok, Mount Holly, NJ (US)

(73) Assignee: Opex Corporation, Moorestown, NJ (US)

( * ) Notice: Subject to any disclaimer, the term of this patent is extended or adjusted under 35 U.S.C. 154(b) by 0 days.

(21) Appl. No.: 09/594,425

(22) Filed: Jun. 15, 2000

Related U.S. Application Data

(63) Continuation of application No. 08/978,836, filed on Nov. 26, 1997.

(51) Int. Cl.[7] .................................................. G06K 7/08
(52) U.S. Cl. ......................... 235/449; 235/493; 209/3.1
(58) Field of Search ................................ 235/449, 385, 235/453, 475, 479, 482, 493; 209/584, 546, 900, 311

(56) References Cited

U.S. PATENT DOCUMENTS 3,266,626 A 8/1966 Simjian
3,315,805 A * 4/1967 William ...................... 235/449
3,386,574 A 6/1968 Kaplan
4,796,196 A 1/1989 Durst, Jr. et al.
4,800,505 A 1/1989 Axelrod
4,863,037 A * 9/1989 Stevens et al. .............. 209/3.1
5,240,116 A 8/1993 Stevens
5,291,002 A * 3/1994 Agnew et al. .............. 235/375
5,299,134 A * 3/1994 Speckhart et al. .......... 364/478
5,329,102 A * 7/1994 Sansone ..................... 235/375
5,397,003 A 3/1995 Stevens
5,420,403 A 5/1995 Allum
5,540,338 A 7/1996 Stevens

FOREIGN PATENT DOCUMENTS

FR 2382951 * 3/1977 ................ 235/449

* cited by examiner

*Primary Examiner*—Karl D. Frech
*Assistant Examiner*—Daniel St. Cyr
(74) *Attorney, Agent, or Firm*—Dann, Dorfman, Herrell and Skillman; Stephen H. Eland

(57) ABSTRACT

A method and apparatus for processing mail. In particular a method and apparatus for distinguishing between different types of documents is disclosed. A document is conveyed past a magnetizing device that imparts a magnetic charge onto any magnetic ink markings that may be on the document. Subsequently, a read head scans the document to determine the presence of magnetic markings. The device then determines the document-type for the document in response to the presence and location of magnetic ink markings on the document. The length of the document is also detected, and the document-type determination is verified based on the length of the document.

20 Claims, 2 Drawing Sheets

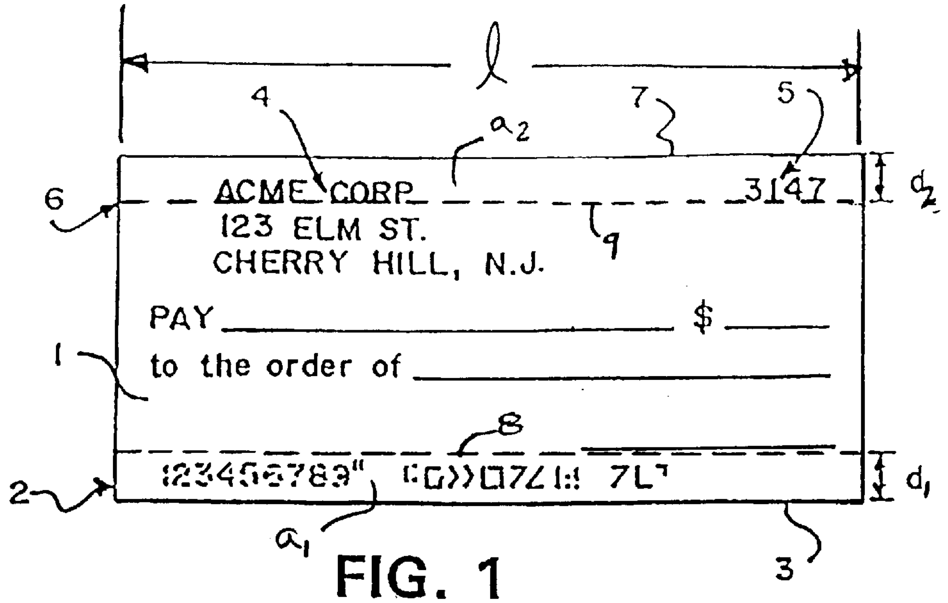
FIG. 1
FIG. 3
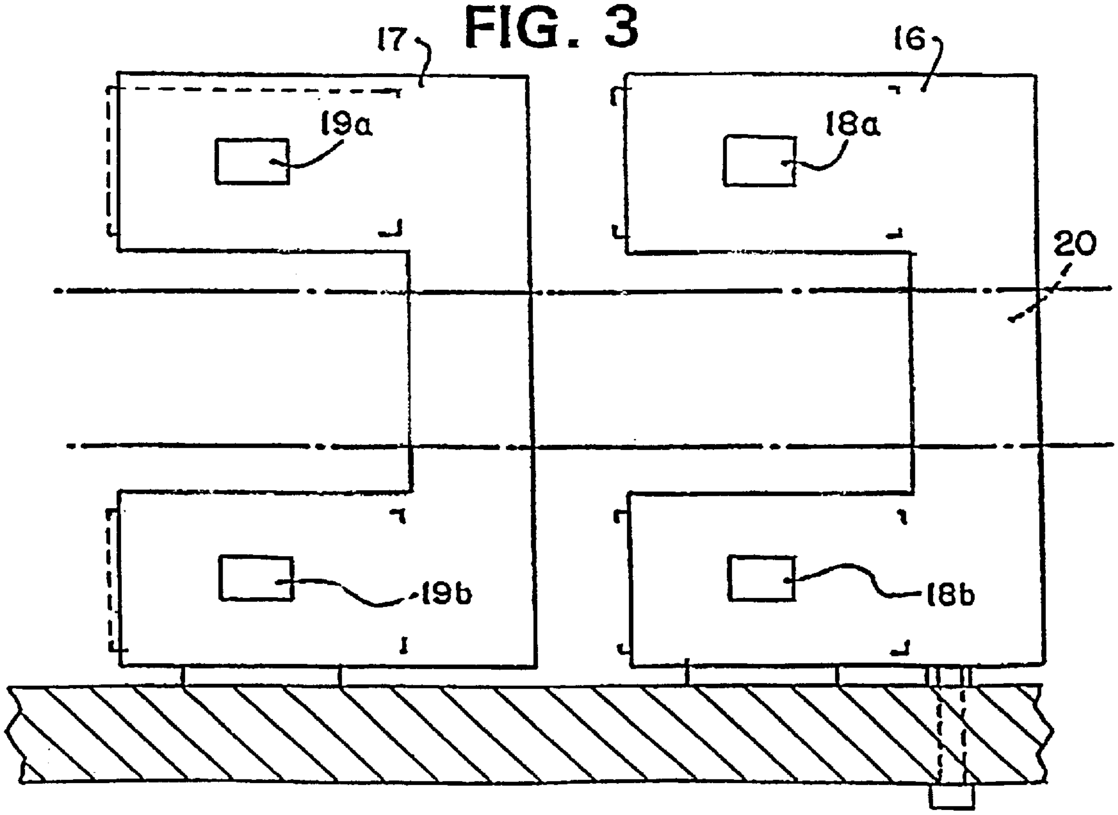

METHOD AND APPARATUS FOR PROCESSING DOCUMENTS TO DISTINGUISH VARIOUS TYPES OF DOCUMENTS

RELATED APPLICATIONS

This application is a continuation of co-pending application Ser. No. 08/978,836 filed Nov. 26, 1997.

FIELD OF THE INVENTION

The present invention relates to a method and apparatus for processing mail, and more specifically to a method and apparatus for scanning documents for various characteristics indicative of the document-type to identify the document-type of each document being processed. In particular, the present invention relates to a method and apparatus for determining whether a document is a check, money order or invoice based upon the magnetic markings on the document.

BACKGROUND

Companies such as public utilities and credit card companies receive a large number of payments from customers each day. Typically, a customer payment includes a payment stub or invoice and a corresponding check or money order. It is desirable for such companies to process the payments rapidly so that the checks and money orders can be deposited as soon as possible. Devices, such as the System 150 manufactured by Opex Corporation in Moorestown, N.J., process mail received by companies by extracting the documents from the envelopes, and reordering, reorienting and sorting the documents as necessary. The documents are then submitted to remittance processing devices that process the information from the documents in order to credit the payments to the customers' accounts. Once the payments are entered, the checks and money orders are deposited by the company.

Currently, when payment documents are processed, the documents are often scanned to create an image of each document. After the documents are scanned, the document images are used during processing rather than the actual documents. However, often the scanned image of a money order is not clear because portions of the document are frequently printed with ink that does not produce a proper image. Consequently, these money orders must be manually retrieved to be processed. Additionally, for a typical batch of checks and money orders being processed, the checks significantly outnumber the money orders. Since the money orders frequently do not produce clear images, it is desirable to separate money orders from the checks to make it easier to locate a particular money order.

BRIEF DESCRIPTION OF THE DRAWINGS

The foregoing summary as well as the following detailed description of the preferred embodiments of the present invention will be better understood when read in conjunction with the appended drawings, in which:

FIG. 1 is a plan view illustrating a check for processing in accordance with the present invention;

FIG. 3 is a sectioned, elevational view of the detection fixture of FIG. 2, taken along the line 3—3.

SUMMARY OF THE INVENTION

Figure 2:
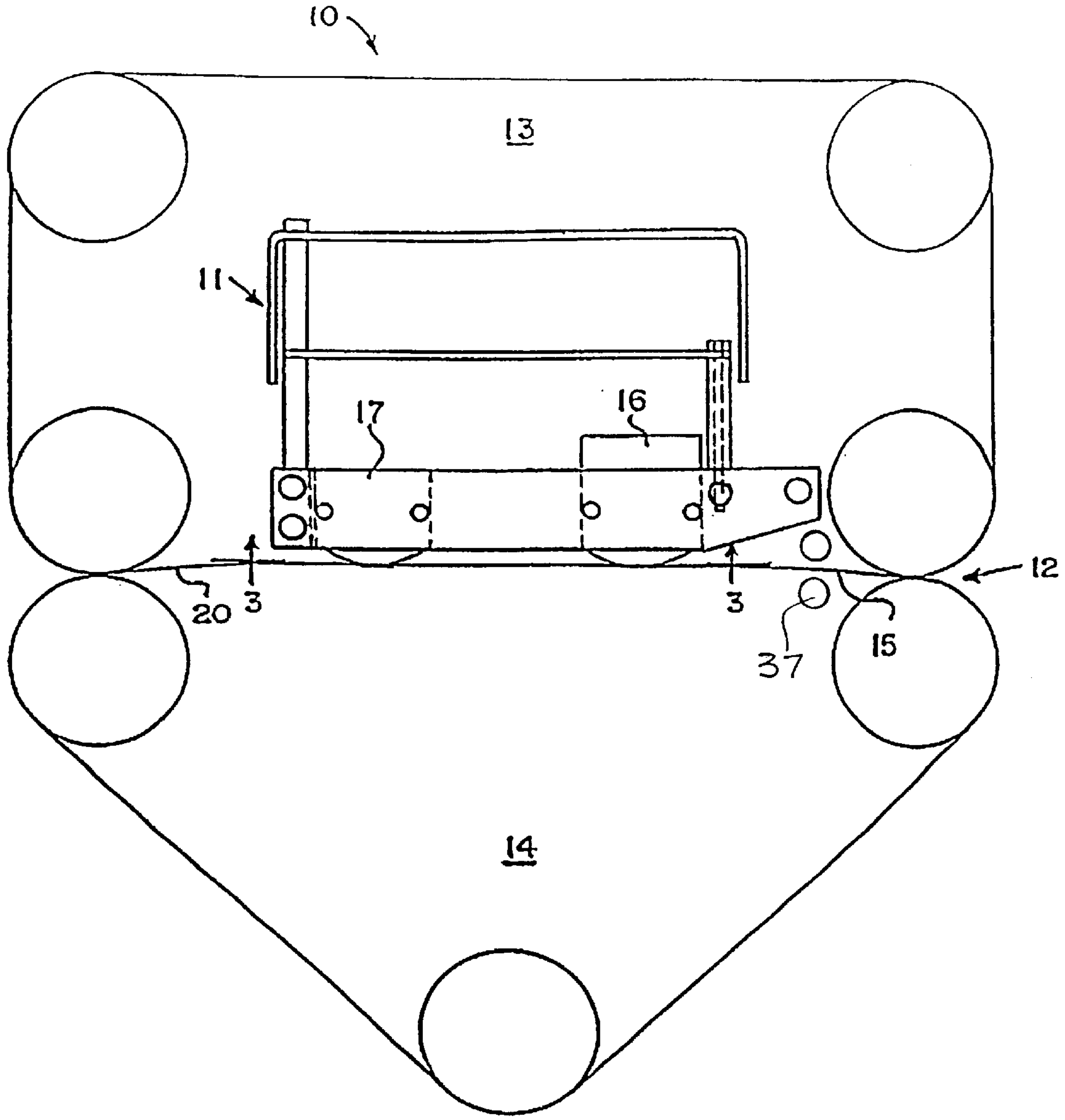
FIG. 2 is a top plan view of a detection fixture for processing documents in accordance with the present invention.

The present invention provides a method for determining the document-type for a particular document. Preferably, the method determines whether a document is a check or a money order. The method includes the step of conveying documents along a document path. A magnetic charge is imparted onto the documents as the documents are conveyed along the document path. The charge is imparted onto two selected areas on each document. After a charge is imparted onto a document, the two selected areas of the document are scanned for magnetic indicia. The document-type is determined based on the presence of magnetic indicia in at least one of the selected areas.

In addition, the present invention provides an apparatus for processing documents having magnetic markings. The apparatus includes a document conveyor for conveying documents along a document path. A magnet is positioned along the document path for imparting a magnetic charge onto the documents. A scanner is also positioned along the document path. The scanner scans two selected areas of each document for magnetic indicia. A controller then determines the document-type for each document based on the presence of magnetic indicia in at least one of the selected areas.

DETAILED DESCRIPTION OF THE PREFERRED EMBODIMENTS

Referring now to the drawings, in general, an apparatus for processing documents 10 is illustrated. The apparatus 10 operates to distinguish between various types of documents. The apparatus 10 scans the documents to determine the document-type based on predefined characteristics of each document-type. The different documents are then further processed according to document-type.

Preferably the apparatus operates to distinguish between two types of documents: checks and money orders. As shown in FIG. 1, a standard check 1 includes a MICR (magnetic ink character recognition) "data line" for processing through the banking system. This MICR line 2 is uniformly placed within an area designated $a_1$ adjacent the lower edge 3 of a standard check. The area $a_1$ is bounded by the lower edge 3 and the dashed line 8, so that the area is of height $d_1$. Additionally, only the identifying characters which comprise this data line are placed in this segregated band $a_1$. This feature, therefore, constitutes a known characteristic which may serve as a primary basis for making determinations as to document-type.

Most checks further include personalized identification fields such as the name of the account owner, and a checking account sequence number. If used, the account name is uniformly placed at 4, while the sequence number is uniformly placed at 5. It has been found that a second area designated $a_2$ adjacent the top edge 7 of a standard check intersects the fields 4, 5, if provided, and that only these identifying fields are found in this segregated band $a_2$. The area $a_2$ is bounded by the top edge 7 and the dashed line 9, so that the area is of height $d_2$. Preferably, the height $d_2$ is equal to the height $d_1$. This feature therefore constitutes a known characteristic which may serve as a secondary basis for making determinations as to document-type. In addition, a personal check generally has a uniform length "I". It has been found that by analyzing such characteristic features, the document-type can be identified.

A money order is typically the same size as a personal check. In particular, the length of a money order is generally standardized so that the length of a money order is generally similar to the length "I" of a personal check. Typically, a money order has a preprinted MICR line that is located similarly to the MICR line 2 on a personal check. In particular, the distance from the bottom edge of a money order to the MICR line is substantially the same as the distance from the bottom edge of a check to the MICR line. However, a money order generally does not have magnetic ink markings other than the MICR line. Specifically, a money order generally does not have either a preprinted address in magnetic ink, or a preprinted checking account sequence number in magnetic ink.

To determine whether a document is a check or a money order, the apparatus 10 scans the document to detect the presence of magnetic markings. The documents are first conveyed past a pair of magnetizing heads 18*a*, 18*b* that impart a magnetic charge to the magnetic ink markings on each document as the documents are conveyed along the document path. A pair of read heads 19*a*, 19*b* then detects the variations in magnetic flux in two selected areas as the documents are conveyed past the read heads. The apparatus 10 then evaluates the data regarding the magnetic flux variations in the first selected area to determine whether magnetic markings are present. Similarly, the apparatus evaluates the data regarding the magnetic flux variations in the second area to determine whether magnetic markings are present.

The detection apparatus 10 operates upon the magnetic ink that is used to print conventionally available checks and money orders. Since the areas that are to be operated upon are rather precisely spaced from the top and bottom edges of the document, the bottom-most edge of the document being scanned should be at a known and proper location. For this reason, the documents to be processed are preferably subjected to a justification step before being introduced to the detection apparatus 10. The justification step may be accomplished either manually, in a tamping procedure, or automatically, making use of an edge justification device of the type disclosed in U.S. Pat. No. 5,460,273, which is incorporated herein by reference.

Referring now to FIGS. 2 and 3, upon entering the detection apparatus 10, documents are presented to a detection fixture 11. A nip 12 which is defined between an opposing pair of belt systems 13, 14 serves to draw the received documents through the detection fixture 11, along a transport path 15. A magnetizing device 16 and a reader 17 are positioned along the transport path 15. The magnetizing device 16 includes a pair of charge heads 18*a*, 18*b* which are capable of imparting a magnetic charge to the ink on the documents that are being passed through the detection fixture 11. Downstream from the magnetizing device 16 is the reader 17, which includes a pair of read head 19*a*, 19*b*. The read heads 19*a*, 19*b* are responsive to flux variations resulting from the movement of charged characters (numerals or lefters) past the heads 19*a*, 19*b*. The charge heads 18*a*, 18*b* and the read heads 19*a*, 19*b* are respectively positioned above and below the belts 20 of the belt systems 13, 14, so that the heads 18*a*, 18*b*, 19*a*, 19*b* are exposed to the documents being conveyed through the detection fixture 11. In addition, the heads 18*a*, 18*b*, 19*a*, 19*b* are vertically and symmetrically positioned so that the heads 18*a*, 18*b*, 19*a*, 19*b* are aligned with each of the areas $a_1$, $a_2$ of the documents that are being processed through the detection fixture 11, irrespective of the orientation of each document as it progresses through the detection apparatus 10. Such alignment permits identification of documents that are right-side up or inverted, facing forward or backward.

To enhance the reading of magnetic flux, it is important for each document to be maintained in proper association with the heads 18*a*, 18*b*, 19*a*, 19*b* as the documents are drawn past the magnetizing device 16 and the reader 17. As a document is drawn through the detection fixture 11, the ink of the document is magnetized at 18*a*, 18*b*, and read at 19*a*, 19*b*, to provide electrical signals which can then be used to determine the document-type.

The device 10 processes the data received by the read heads 19*a*, 19*b* as follows. The read heads 19*a*, 19*b* obtain data regarding the magnetic flux variations in two selected areas $a_1$, $a_2$ as a document passes the read heads. Typically the data points are taken at 0.1 inch intervals. If a magnetic ink marking is detected in a selected area, the device evaluates the data to determine the location of the right and left edges of the magnetic marking along a line through the selected area. The distance between the right and left edges of the magnetic markings along a line determines the length of the magnetic markings. If the length is within a predefined range, then the magnetic marking may be a MICR line. In the present instance, if the length between the right and left edges is between 25–45 data points, then the marking may be a MICR line. The number of gaps in magnetic indicia between the right and left edges are then evaluated. If the number of gaps is below a threshold and the length is within the predefined range, then the marking is determined to be a MICR line. Preferably, the threshold is set at 10 gaps.

More specifically, the read heads 19*a*, 19*b* determine the presence of magnetic indicia at a plurality of points along a read line in one of the preselected areas. The device evaluates the data for the points along the line to determine the right-most point corresponding to magnetic indicia and the left-most point corresponding to magnetic indicia. The device then evaluates the points between this left-most point and this right-most point to determine the number of points corresponding to gaps between the right-most point and the left-most point. If a point does not indicate the presence of magnetic indicia, then the point is considered a gap. If the number of gaps between the right-most point and the left-most point is below a threshold, then the magnetic marking is determined to be a MICR line, otherwise the device considers the mark to be some other type of magnetic ink marking.

In implementation, the detection fixture 11 may form part of a mail extraction apparatus, such as the "System 150" extraction system manufactured by Opex Corporation of Moorestown, N.J. The detection fixture 11 may also form part of a stand-alone apparatus useful in the pre-processing and post-processing of documents, if desired. For example, in some cases it may be desirable to present sealed envelopes to the detection fixture 11, prior to subjecting the envelopes to an extraction procedure, to identify envelopes containing checks or money orders (for expedited processing) and/or to identify the type of documents contained by the envelopes (to facilitate their subsequent processing). In other cases, it may be desirable to present extracted documents to the detection fixture 11, following an extraction procedure, to identify checks and/or money orders to facilitate their subsequent processing.

Irrespective of its manner of implementation, the detection fixture 11 is capable of operating either directly upon documents which are exposed to it, or indirectly upon documents contained within an envelope (and which are therefore separated from the detection fixture 11 by one or more paper thicknesses). One potential variable is that of gain (in operating the charge heads 18*a*, 18*b* and/or the read heads 19*a*, 19*b*), which may be adjusted as needed and in accordance with the particular application involved. Upon detecting the document-type of a particular document, steps may be taken to either record the determined document-type (in memory for subsequent processing) or to develop electrical signals for presentation to a sorting device such as are disclosed in U.S. Pat. No. 5,460,273.

As documents pass the detection fixture 11 (irrespective of the manner in which the detection apparatus 10 is employed), electrical signals are developed for application to a detection circuit. As previously indicated, a magnetic charge will first be imparted to any magnetic ink markings which are located in the selected areas of the document being scanned as the document passes the charge heads 18*a*, 18*b*. This magnetic charge is preferably imparted to the magnetic ink using a permanent magnet, although electromagnetic means could be employed, if desired. To be noted is that an appropriate charge will be imparted to the magnetic ink characters on the check even if the magnetic ink is separated from the charge heads 18*a*, 18*b* by one or more paper thicknesses, since the desired charge will pass through the paper of the document, or an overlying envelope, as it passes the charge heads 18*a*, 18*b*. Similarly, the read heads 19*a*, 19*b* will operate to read the magnetic markings either directly, or through the document (for post-processing), or through the overlying envelope (for preprocessing), for subsequent interpretation.

Based on the presence of magnetic ink markings indicated by the read heads, the apparatus determines the document-type. If the apparatus determines that there are magnetic ink markings in only one of the selected areas, then the apparatus identifies the document as a money order, because a money order typically only has one magnetic marking, i.e. the MICR line. Conversely, if the apparatus determines that there are magnetic ink markings in both of the selected areas, then the apparatus identifies the document as a check because a check normally has magnetic ink markings that coincide with the location of the two selected areas.

The two preselected areas are located with respect to the standard pattern of magnetic ink markings on a typical personal check. Referring to FIG. 1, the first selected area $a_1$ is located so that the first area encompasses at least a portion of the MICR line of a check or money order when the document is in an upright orientation. If all of the document are oriented in an upright orientation, then it is sufficient to locate the first area to simply detect the MICR. However, it may be desirable to determine the document type before the documents are oriented into a face-forward upright orientation. If the documents are randomly oriented, the first area is located so that the first area encompasses both a portion of the MICR line if the document is upright and at least a portion of either the preprinted address or the preprinted checking account sequence number if the document is a check in an inverted orientation. In addition, preferably the first scan area extends along the entire length of the document being processed. In this way, regardless of the document orientation, if the document is a check the first area will encompass a magnetic marking.

Similarly, the second area $a_2$ is located so that the second area encompasses at least a portion of the preprinted address or checking account sequence number of a check when the check is in an upright orientation. If the documents are randomly oriented, the second area is located so that the second area encompasses both a portion of the address or checking account sequence number if the document is a check in an upright orientation and at least a portion of the MICR line if the document is inverted. Preferably, the second scan area extends along the entire length of the document being processed. In this way, regardless of the document orientation, if the document is a check, the second area will encompass a magnetic marking.

In addition to distinguishing between checks and money orders, the detection device 10 is operable to distinguish between three document types, such as checks, money orders and invoices. Often, invoices are not printed with magnetic ink markings. In such instances, the detection device 10 determines that a document is an invoice if there are no magnetic markings in either the first or second area. If a magnetic marking is indicated in either area $a_1$, $a_2$, the document is assumed to be either a check or a money order, and the detector distinguishes between the two documents types as described above.

Frequently, invoices are printed with magnetic ink markings. Such markings may overlap with one or both of the selected scanning areas $a_1$, $a_2$, thus leading to the possibility of an erroneous document-type determination. Therefore, when distinguishing invoices from checks and money orders it is desirable to incorporate a verification characteristic to ensure that the document-type is properly determined.

In the present instance, the document length operates as a verification characteristic. The length "I" of a personal check and the length of a money order is substantially the same. In addition, this length is substantially uniform for personal checks and money orders. Therefore, the length of the document can be used as a verification characteristic as follows.

A sensor 37 is provided for detecting the length of the document. The sensor 37 detects the leading edge and the trailing edge of the document. The speed of the document along the transport path is generally constant and known. Therefore, the length of the document can be determined by the time interval between detection of the leading and trailing edges.

It should also be noted that the sensor 37 allows for determining the orientation of documents. For example, if a document is scaned by the detection fixture 11 and the MICR line is detected by the lower MICR read head 19*b*, as described above, it is determined that the document is a money order. In addition, since the MICR is detected by the bottom head, it may be determined that the money order is right-side-up. Furthermore, by correlating the MICR line postion with the lead and trail edges of the document, it can be determined whether the money order is facing forward or backward. Specifically, if the MICR line is closer to the lead edge it may be determined that the money order is facing forward. Similarly, all four orientation of money orders and checks can be determined.

The detection device 10 detects the magnetic markings on a document as the document is transported along the transport path 15. If the read heads 19*a*, 19*b* do not detect any magnetic markings, then the device determines that the document is an invoice. The document is then electronically tagged with the document-type data for further processing of the document. If the read heads detect one or more magnetic ink marking, then the device 10 makes an initial determination as to whether the document is a check or money order. If the length of the document is within a range corresponding to the length of a standard check or money order, then the device verifies that the document is a check or money order.

For example, if the read heads 19*a*, 19*b* detect a magnetic marking in the first selected area $a_1$, but not in the second selected area $a_2$ and the document length is "I", corresponding to the length of a standard money order, then the device determines that the document is a money order. If, however, the read heads 19*a*, 19*b* detect a single magnetic ink marking in the first selected area and the document length is substantially longer than "I", then the device determines that the document is an invoice.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. A method for determining whether a document is a first-type, a second-type, or a third-type, comprising the steps of:

a. conveying documents along a document path;

b. exposing two selected areas of the documents to a magnetic field as the documents are conveyed along the document path;

c. measuring the length of the documents as they are conveyed along the document path;

d. scanning the two selected areas to detect the presence of magnetic indicia in the two selected areas as the documents are conveyed along the document path;

e. identifying documents having magnetic indicia in both selected areas and having a first length as being a first-type of document;

f. identifying documents having magnetic indicia in only one of the areas and having the first length as being a second-type of document;

g. identifying documents having magnetic indicia and having a second length as being a third-type of document; and h. processing the document according to the identified document-type.

2. A method for determining whether a document is of a first document-type, a second document-type, or a third document-type, comprising the steps of:

a. conveying the document along a document path;

b. exposing two selected areas of the document to a magnetic field as the document is conveyed along the document path;

c. scanning the two selected areas to detect presence of magnetic indicia as the document is conveyed along the document path;

d. detecting the length of the document;

e. determining the document-type in response to the length of the document and the presence of magnetic indicia in at least one of the selected areas; and f. sorting the document in response to the determination of the document-type.

3. The method of claim 2 further comprising the step of determining the document-type in response to the presence of magnetic indicia in both of the selected areas.

4. A method of determining whether a document is a first document-type having a first pattern of magnetic markings or a second document-type having a second pattern of magnetic markings, comprising the steps of:

a. conveying the document along a document path;

b. exposing two selected areas of the document to a magnetic field as the document is conveyed along the document path;

c. scanning the two selected areas for magnetic indicia as the document is conveyed along the document path;

d. detecting the length of the document;

e. determining the document-type in response to the presence of magnetic indicia in at least one of the selected areas; and f. verifying the document-type determination if the length of the document is within a pre-determined range.

5. The method of claim 4 comprising the step of determining the document-type in response to the presence of magnetic indicia in both of the selected areas.

6. The method of claim 4 comprising the step of sorting documents of the first document-type to a first area and sorting documents of the second document-type to a second area.

7. An apparatus for processing documents, comprising:

a. a conveyor for transporting a document along a document path;

b. a magnet positioned along the document path for imparting a magnetic charge on the document as the document is conveyed along the document path;

c. a scanner positioned along the document path operable to scan two selected areas of the document to detect the presence of magnetic indicia;

d. a measuring device for measuring the length of the document as the document is conveyed along the document path; and e. a controller for determining the document-type for the document in response to the length of the document and the presence of magnetic indicia in at least one of the selected areas.

8. The apparatus of claim 7 wherein the scanner scans the selected areas at a plurality of points along a line to detect the presence of magnetic indicia.

9. The apparatus of claim 7 comprising a gate for directing the document along one of at least two alternate paths in response to the determination of document-type.

10. The apparatus of claim 9 wherein the controller determines the document-type in response to the presence of magnetic indicia in two of the selected areas.

11. An apparatus for processing documents having magnetic markings, comprising:

a. a conveyor for transporting a document along a document path;

b. a magnet positioned along the document path for imparting a magnetic charge on the document as the document is conveyed along the document path;

c. a scanner positioned along the document path operable to scan two selected areas of the document for magnetic indicia;

d. a length detector for detecting the length of the document; and e. a controller for determining the document-type for the document in response to the detected length of the document, the number of magnetic indicia identified and the location of the identified magnetic indicia.

12. The apparatus of claim 11 wherein the scanner scans the selected areas at a plurality of points along a line to detect the presence of magnetic indicia.

13. The apparatus of claim 11 comprising a gate for directing the document along one of at least two alternate paths in response to the determination of document-type.

14. The apparatus of claim 11 wherein the controller determines the document-type in response to presence of magnetic indicia in two of the selected areas.

15. The apparatus of claim 11 wherein the controller is operable to determine whether the document is of a first document-type, a second document-type or a third document-type in response to the presence of magnetic indicia in at least one of the selected areas.

16. The apparatus of claim 11 wherein the controller is operable to determine whether the document is a first document-type having a first pattern of magnetic markings or a second document-type having a second pattern of magnetic markings in response to presence of magnetic indicia in at least one of the selected areas.

17. A method for processing documents, comprising the steps of:

conveying documents along a document path;

exposing two selected areas of each document to a magnetic field as the document is conveyed along the document path;

scanning each document to detect magnetic indicia on the document;

measuring the length of each document;

analyzing the detected magnetic indicia to determine whether the document has a first pattern of magnetic markings, a second pattern of magnetic markings or a third pattern of magnetic markings;

directing documents having the first pattern of magnetic markings to a first area;

directing documents having the second pattern of magnetic markings to a second area;

directing documents having the third pattern of magnetic markings to a third area; a directing documents having a pattern of magnetic markings other than the first, second or third patterns of magnetic markings to a fourth area; and directing a document to the fourth area if the document has the first magnetic markings pattern and a length outside a predetermined range.

18. The method of claim 17 comprising directing a document to the fourth area if the document has the second magnetic markings pattern and a length outside a predetermined range.

19. The method of claim 18 comprising directing a document to the fourth area if the document has the third magnetic markings pattern and a length outside a predetermined range.

20. The method of claim 17 wherein the third pattern of magnetic markings comprises an absence of any magnetic indicia.

* * * * *